United States Patent [19]

Menke

[11] 4,441,668
[45] Apr. 10, 1984

[54] INFRARED-OPTICAL AIMING AND GUIDING DEVICE

[75] Inventor: Josef F. Menke, Glücksburg, Fed. Rep. of Germany

[73] Assignee: Elektro-Optik GmbH & Co. KG, Glucksburg, Fed. Rep. of Germany

[21] Appl. No.: 145,472

[22] Filed: Apr. 21, 1980

[51] Int. Cl.³ .............................................. F41G 7/30
[52] U.S. Cl. .................................................. 244/3.11
[58] Field of Search .................... 244/3.11, 3.13, 3.14

[56] References Cited

U.S. PATENT DOCUMENTS 3,974,383 8/1976 Chapman ........................... 244/3.11
4,038,547 7/1977 Hoesterey ......................... 244/3.11
4,183,482 1/1980 Jozwiak ............................. 244/3.11

Primary Examiner—Charles T. Jordan
Attorney, Agent, or Firm—William R. Hinds

[57] ABSTRACT

In the combination of a daylight aiming device, a night aiming device and a guiding device for tracer missiles emitting infrared beams of a narrow spectral band both the night aiming device and the guiding device work on infrared beams of the same spectral region. This region includes the narrow spectral band of the beams emitted by the missile. Partially transmitting mirror means are arranged along the optical axis of the night aiming device for filtering the missile beams of the narrow spectral band out of the beam bundle and reflecting them to the guiding device, which conducts flight path control signals to the missile. The remaining beams of the spectral region are transmitted to the aiming device. An infrared/visible-light image converter is part of the aiming device. The visible light rays emitted by the converter are reflected into the ocular lens of the aiming device for viewing by the operator.

3 Claims, 2 Drawing Figures

INFRARED-OPTICAL AIMING AND GUIDING DEVICE

BACKGROUND OF THE INVENTION

The invention relates to an aiming device in combination with a device for guiding tracer missiles to the target, especially anti-tank missiles.

More particularly the invention relates to a combination of such an aiming and guiding device which uses the infrared beams of the spectral region.

In the combination the guiding device usually comprises first a goniometer for measuring the difference between the flight path of the missile and the line of sight of the aiming device and, secondly, a controlling device for transmitting control signals to the missile. The magnitude or intensity of the signals is derived from the measurement of the goniometer.

For fighting tanks, preferably semi-automatic weapon systems of the 'line-of-sight-guiding-type' are used today. In this system, after firing the missile, the latter is caused to 'jump' on the line of sight of the aiming device by signals transmitted by the controlling device which operates in combination with the aiming device. For such a guiding action it is a condition that the line of sight of the aiming device and the zero-line of the goniometer are identical or, at least, extend in parallel.

In such devices the goniometers use almost exclusively beams of a wave length of 0.002–0.005 millimeters (=2–5 $\mu$m) which equals approximately 0.00008–0.0002 inches. In infrared technology this wave length region is known as the '1st window' as compared, for example, to the 3rd window which consists of beams having a wave length of approximately 8–14 $\mu$m (=0.00032–0.00056 inches). The aiming device is usually a monocular telescope having cross lines. This constitutes a daylight aiming device.

For the use at night a supplementary aiming device is required which either works with infrared beams of the 1st window or of the 3rd window. Using beams of the 3rd window requires considerably more provisions especially with regard to the detector than would be needed if beams of the 1st window were applied. However, if beams of the 3rd window are used an image of the target is obtained that comprises considerably more information details than an image made up of beams of the 1st window.

Therefore, in spite of the more difficult working conditions mostly a night aiming device is used which works with beams of the 3rd window.

For the guiding device image details are not required. Therefore the guiding devices usually work with infrared beams of the 1st window because this is easier to accomplish and less costly.

It is, however, a disadvantage of such a combined aiming and guiding device of which the aiming device works in the 3rd window and the guiding device works in the 1st window that in hazy weather in spite of poor visibility in the target area the aiming device still works satisfactory in the 10 $\mu$m band while the guiding device in the 2 $\mu$m band cannot see the missile, even at a short distance from the place of its firing. The guiding device can then no longer receive beams from the missile and conduct control signals to the missile and the missile may get lost.

It is therefore an object of the present invention to provide an infrared optical aiming and guiding device which overcomes this disadvantage.

This object could easily be attained if an aiming device and a guiding device would be combined that both use infrared beams of the same window. In such a combination the two devices will 'see' the same objects, i.e. both will have the same range of vision. It can then no longer occur that the aiming device recognizes more details than the guiding device.

However, there arises the following difficulty: If the beams emitted by the missile and the beams used by the aiming device and the guiding device are of the same wavelength region then the missile light will blind the aiming device to an extent that makes proper aiming very difficult, if not completely impossible.

It is, therefore, the particular object of the invention to provide a combined infrared optical aiming and guiding device that both work in the same spectral region but wherein in spite thereof the aiming device is not blinded by the missile.

SUMMARY OF THE INVENTION

This particular object of the invention is attained by providing a combined aiming and missile guiding device which uses a goniometer and a night aiming device that both work in the same spectral region (infrared beam window) and which comprises filter means that prevent the infrared beams emitted by the missile from impinging on the aiming device and blinding the latter. Thus, according to the invention the combination includes in the beam path of the night aiming and the guiding device a reflecting means which is exactly adjusted to the wavelength of the missile light and thus cuts the missile beams out of the general beam bundle and reflects them to the goniometer, while the remaining beams are left to travel to the aiming device.

In a preferred embodiment of the invention both the night aiming device and the guiding device work in the wavelength region between 8–14 $\mu$m (3rd window) and a laser in the 10 $\mu$m region is used as the missile light. The reflecting means is then adjusted accurately to this small 10 $\mu$m band. Preferably a $CO_2$-laser may be used which emits beams having a wavelength of 10.6 $\mu$m.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
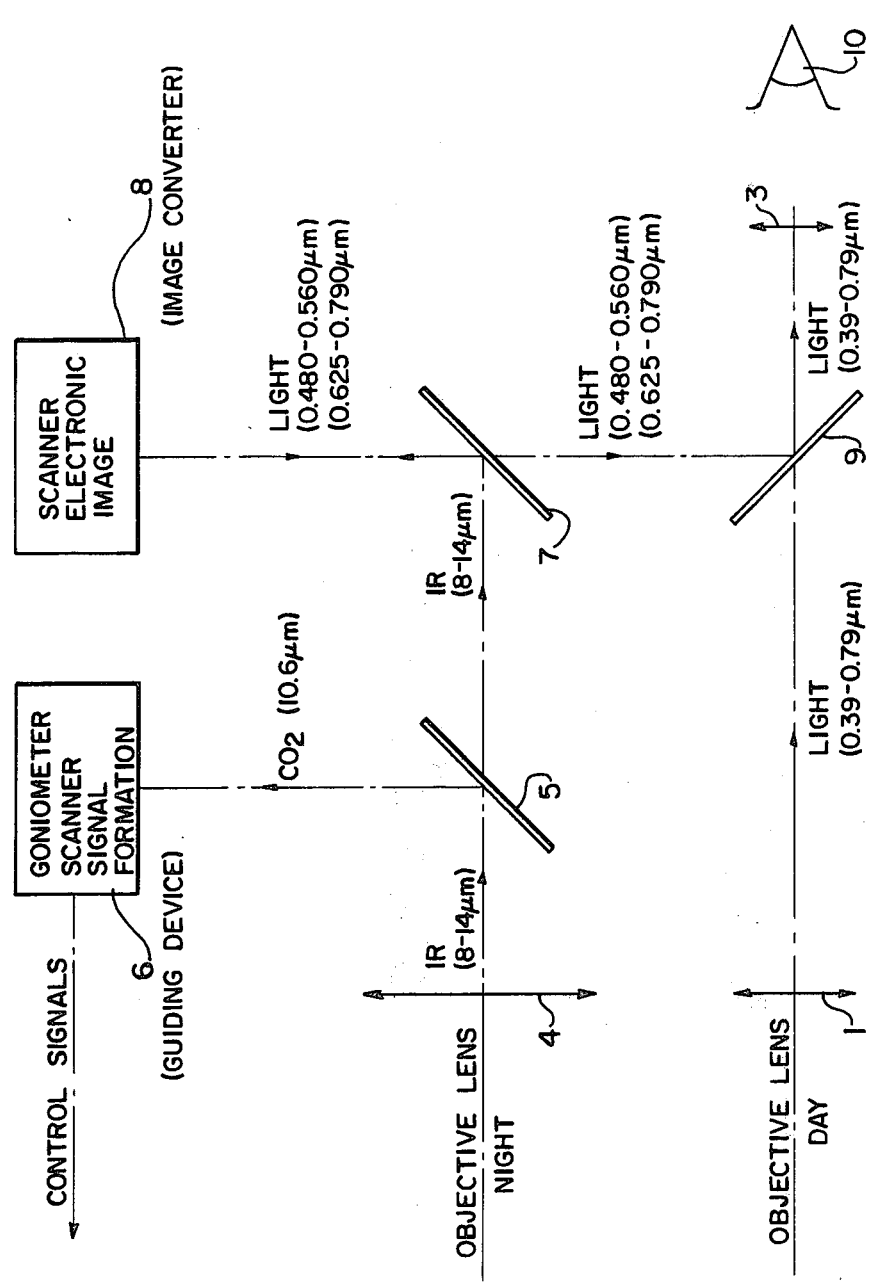
FIG. 1 shows schematically a daylight aiming device in combination with a night aiming device and a missile guiding device.

Referring now to the drawings, in FIG. 1 the objective lens of the daylight aiming device is designated by the reference numeral 1. This daylight aiming device works with visible light. In combination with an ocular 3 it constitutes a normal aiming telescope.

The objective lens of the night aiming device is designated by the numeral 4. It is arranged with its optical axis extending parallel to the axis of the objective lens 1. In the image-side beam path of the objective lens 4 there is arranged a first partially reflective (and consequently partially transmitting) mirror 5 which reflects the beams of the 10.6 μm wavelength band but transmits all other beams of the 8–14 μm spetral region (3rd window). The reflected beams travel to the guiding device (goniometer) 6 which measures the difference between the missile path and the line of sight of the aiming device and issues control signals to the missile to bring the latter back on the line of sight, if such difference should exist.

The transmitted beams impinge on a second partially reflective mirror 7 which reflects a portion of the complete band width (8–14 μm) to an image converter 8. The image converter transforms the infrared-light image into a visible-light image. From the converter 8 the visible light beams emerge in the direction of the reflective mirror 7. They pass through the latter to a third partially reflective mirror 9 arranged in the beam path of the daylight aiming device. The mirror 9 reflects a portion of the beams into an ocular 3 and into the observers eye 10.

The device functions as follows:

For aiming during daytime the objective lens 1 is used in combination with the ocular 3. For guiding the missile the objective lens 4 of the night aiming device is used both during daytime and at night in combination with the mirror 5 and the guiding device 6.

In case of dim light conditions and at night the objective lens 4 of the night aiming device is used for aiming as well as for missile guiding. By the partially reflective mirror 5 the beams of the 10.6 μm wavelength are reflected to the guiding device 6 where they are used for measurement and missile control. All the other beams transmit via mirror 5 to the image converter 8. The visisble light image provided by the converter is then viewed by the observer via the ocular 3.

Figure 2:
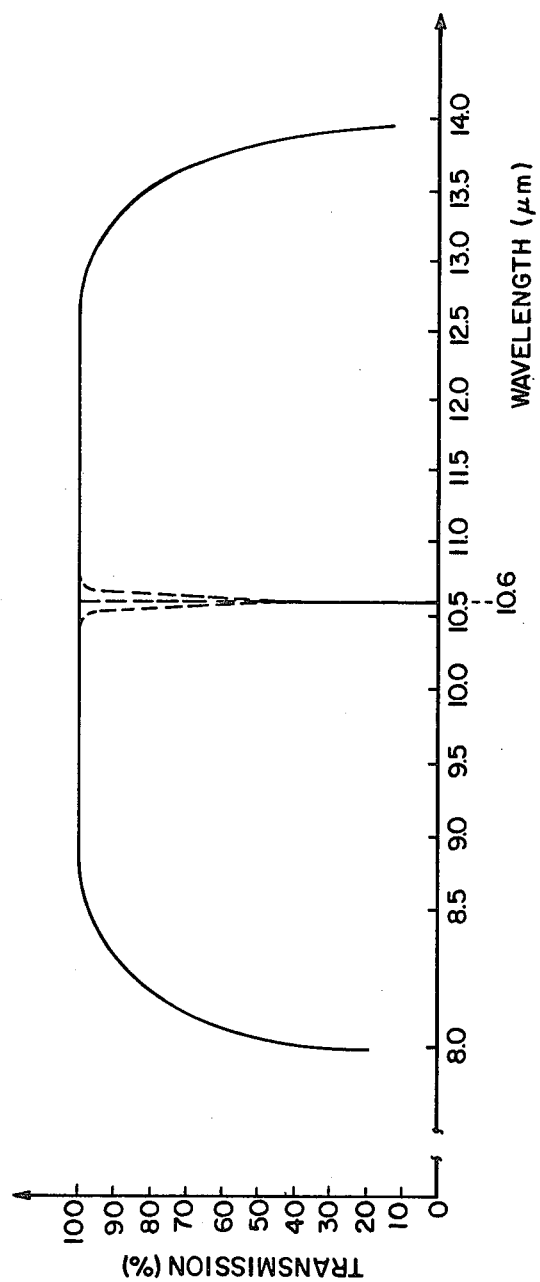
FIG. 2 is a diagram showing the intensity of the infrared beams impinging on the night aiming device in dependence on the beam wavelength.

FIG. 2 shows diagrammatically the intensity of the beams impinging on the image converter 8 in dependence on their wavelength. The diagram shows that at a wavelength of 10.6 μm there is a drastic gap in the beam intensity. This results from the 10.6 μm wavelength being filtered out of the beam bundle and reflcted to the guiding device by the mirror 5.

From this description it will be well understood that the stated object of the invention is fully attained: both devices, the aiming device and the guiding device work in the same spectral region but still the aiming device is not blinded by the beams emitted by the missile because precisely these beams are filtered out of the beam path prior to reaching the aiming device.

What is claimed is:

1. An aiming and guiding device for tracer missiles emitting infrared beams of a narrow spectral band, the device comprising
    a. a daylight aiming device including a first objective lens and an ocular;
    b. a night aiming device including a second objective lens and a converter for transforming infrared-beam images into visible-light images; the axes of the first objective lens and the second objective lens extending in parallel;
    c. a missile guiding device including a goniometer for measuring the difference between the missile path and the line of sight of the aiming device and for issuing control signals for guiding the missile on the line of sight of the aiming device; the night aiming device and the goniometer both utilizing infrared beams of the same spectral region which also includes the narrow spectral band of the beams emitted by the missile;
    d. first partially transmitting mirror means arranged along the optical axis of the second objective lens for reflecting the narrow band of infrared beams emitted by the missile to the goniometer and for transmitting all remaining infrared beams of the spectral region to the infrared/visible-light image converter; and
    e. second partially transmitting mirror means in the optical path of the first objective for reflecting part of the visible light beams emitted by the converter into the ocular of the daylight aiming device.

2. An aiming and guiding device as claimed in claim 1, wherein the night aiming device and the missile guiding device utilize infrared beams of an approximate wavelength between 8–14 μm (3rd window); wherein further the missile beam emitting means is a laser means emitting beams of a wavelength of substantially 10 μm and wherein the first partially transmitting mirror means is adjusted to reflect the narrow 10 μm wavelength band.

3. An aiming and guiding device as claimed in claim 2, wherein the laser means is a $CO_2$-laser emitting beams of a wavelength of substantially 10.6 μm.

* * * * *